(12) United States Patent
Diep et al.

(10) Patent No.: US 7,376,832 B2
(45) Date of Patent: May 20, 2008

(54) DISTRIBUTED METHOD, SYSTEM AND COMPUTER PROGRAM PRODUCT FOR ESTABLISHING SECURITY IN A PUBLISH/SUBSCRIBE DATA PROCESSING BROKER NETWORK

(75) Inventors: Catherine C. Diep, Cupertino, CA (US); John W. Huang, Warren, NJ (US); Paul J. Wanish, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 10/420,065

(22) Filed: Apr. 21, 2003

(65) Prior Publication Data

US 2004/0250060 A1   Dec. 9, 2004

(51) Int. Cl.
*H04L 9/00* (2006.01)
(52) U.S. Cl. ..................................... 713/155
(58) Field of Classification Search ................ 380/239, 380/35, 36; 713/155; 726/5, 19
See application file for complete search history.

(56) References Cited

U.S. PATENT DOCUMENTS

| | | | |
|---|---|---|---|
| 5,815,665 A | 9/1998 | Teper et al. | 395/200.59 |
| 6,154,781 A | 11/2000 | Bolam et al. | 709/238 |
| 6,182,143 B1 | 1/2001 | Hastings et al. | 709/231 |
| 6,202,093 B1 | 3/2001 | Bolam et al. | 709/225 |
| 6,226,618 B1* | 5/2001 | Downs et al. | 705/1 |
| 7,133,846 B1* | 11/2006 | Ginter et al. | 705/54 |
| 2001/0051996 A1* | 12/2001 | Cooper et al. | 709/217 |

FOREIGN PATENT DOCUMENTS

| | | |
|---|---|---|
| EP | 0961452 A2 | 12/1999 |
| EP | 1043671 A2 | 10/2000 |
| EP | 1132844 A2 | 9/2001 |
| WO | WO 00/36542 | 6/2000 |

OTHER PUBLICATIONS

Java Message Service, "The JMS API is an API for accessing enterprise messaging systems from Java programs", Version 1.1, Apr. 12, 2002, pp. 1-140.

(Continued)

*Primary Examiner*—Ellen Tran
(74) *Attorney, Agent, or Firm*—Lily Neff, Esq.; Kevin P. Radigan, Esq.; Heslin Rothenberg Farley & Mesiti, P.C.

(57) ABSTRACT

A technique for establishing security in a publish/subscribe data processing broker network is presented. The technique includes providing a security extension module from a publisher to a broker of the network, wherein the security extension module is for a topic asset of the publisher. The broker employs the security extension module, responsive to receipt of a request from a subscriber for the topic asset, to authenticate the request at the broker before pushing the topic asset of the publisher to the subscriber. In addition to authenticating the request, the security mode extension can be employed to authorize the request, and to automatically forward messages to the publisher providing information on when topic asset access by a subscriber begins and ends.

5 Claims, 6 Drawing Sheets

OTHER PUBLICATIONS

Java™ Message Queue, Version 1.1, Release Notes, May 31, 2000, http://docs.sun.com/source/816-5908-10/, pp. 1-16.

Java™ Message Service API Frequently Asked Questions, http://java.sun.com/products/jms/faq.html, pp. 1-8, Feb. 24, 2003.

Sun [tm] ONE Message Queue—Data Sheet, http://www.sun.com/software/products/message_queue/ds_message_queue.html, pp. 1-8, Feb. 24, 2003.

S. Trythall, "Security and JMS", eAI Journal, Jul. 2002, pp. 41-43.

L. Nadile, SD Times: Special Report, "JMS API Lacks Security, Encryption", http://www.sdtimes.com/news/027/special3.htm, pp. 1-2, Apr. 1, 2001.

S. Terry, Wiley:: Enterprise JMS Programming, http://www.wiley.com/cda/product/0,,0764548972,00.html, pp. 1-2, Feb. 2002.

"Letters to the Editor", Java World, Nov. 2002, http://www.javaworld.com/javaworld/jw-11-2002/jw-1129-letters.html, pp. 1-9.

"Java Message Service (JMS)", http://www.peterindia.com/JMSOverview.html, pp. 1-11, Feb. 24, 2003.

"Should you go with JMS?—Why JMS isn't always the best solution for distributed system development", JavaWorld, Oct. 2002, http://www.javaworld.com/javaworld/jw-10-2002/jw-1025-jms.html, pp. 1-7.

"What's not in JMS", SilverStream Software, Inc., 1998-2002, http://www.novell.com/documentation/lg/extendas/sshelp/jbrokerMQ/docs/concepts/missi..., 1 pg.

* cited by examiner fig. 1
(PRIOR ART)

fig. 2 fig. 3 fig. 4
400 fig. 5 fig. 6

DISTRIBUTED METHOD, SYSTEM AND COMPUTER PROGRAM PRODUCT FOR ESTABLISHING SECURITY IN A PUBLISH/SUBSCRIBE DATA PROCESSING BROKER NETWORK

TECHNICAL FIELD

The present invention relates in general to the field of data processing, and more particularly, data processing which distributes messages from suppliers, manufacturers, content providers (hereinafter called "publishers") of data messages to consumers (hereinafter called "subscribers") of such messages.

BACKGROUND OF THE INVENTION

Publish/subscribe data processing systems have become very popular in recent years as a way of distributing data messages from publishing computers to subscribing computers. The increasing popularity of the Internet, which has connected a wide variety of computers all over the world, has helped to make such publish/subscribe systems even more popular. Using the Internet, a World Wide Web browser application (the term "application" or "process" refers to a software program, or portion thereof, running on a computer) can be used in conjunction with the publisher or subscriber in order to graphically display images. Such systems are especially useful where data supplied by a publisher is constantly changing and a large number of subscribers need to be quickly updated with the latest data. One example of where this is useful is in the distribution of stock market data.

In such systems, publisher applications of data messages do not need to know the identity or location of subscriber applications which will receive the messages. The publishers need only connect to a publish/subscribe distribution agent process, which is included in a group of such processes making up a broker network, and send messages to the distribution agent process, specifying the subject of the message to the distribution agent process. The distribution agent process then distributes the published messages to subscriber applications which have previously indicated to the broker network that they would like to receive data messages on particular subjects. Thus, the subscribers also do not need to know the identity or location of the publishers. The publishers need only to connect to a broker's distribution agent process.

In order to allow a broker network to determine which published messages should be sent to which subscribers, publishers provide a broker with the name of a distribution stream for each published message. A distribution stream (called hereinafter a "topic") is an ordered sequence of messages having a name (e.g., "stock" for a stream of stock market quotes) to distinguish the stream from other streams. Likewise, subscribers provide the broker with the name of the streams to which they would like to subscribe. In this way, the broker keeps track of which subscribers are interested in which streams so that when publishers publish messages to such streams, the messages can be distributed to the corresponding subscribers. Subscribers are also allowed to provide filter expressions to the broker in order to limit the messages which will be received on a particular stream.

The above-described publish/subscribe broker network architecture advantageously centralizes coordination of published messages. Authentication of a subscriber for a particular topic could require that the subscriber's identity (digital certificate) be passed back to the publisher in order to validate the subscriber. This process of requiring authentication at the publisher can degrade performance of the distributed system depending upon where the publisher and subscriber may be located relative to each other. In many cases, the broker may be much closer to the subscriber than the publisher. In such a situation, requiring authentication at the publisher can limit how fast the subscriber can start to receive the requested topic.

Therefore, a need exists in the art for an enhanced technique for ensuring security in a publish/subscribe data processing broker network, which facilitates a valid subscriber's timely obtaining of requested information.

SUMMARY OF THE INVENTION

According to one aspect, the present invention provides a method for establishing security in a publish/subscribe data processing broker network. This method includes: providing a security extension module from a publisher to a broker of the network, the security extension module being for a topic asset of the publisher (or a set of topic assets); and employing the security extension module at the broker responsive to receipt of a request from a subscriber for the topic asset, the employing including validating the request using the security extension module and authenticating the subscriber at the broker before pushing the topic asset of the publisher to the subscriber.

In certain enhanced aspects, the present invention includes authenticating the request at the broker using the security extension module without forwarding the request to the publisher. In addition to authenticating the request, the security extension module is used to authorize a particular request at the broker before pushing the topic asset of the publisher to the subscriber, including possibly modifying the information content or presentation of the information content. The security extension module can further be employed to automatically send a begin information access message from the broker to the publisher upon the broker beginning pushing of the topic asset to the subscriber, and automatically forwarding an end information access message from the broker to the publisher upon the broker terminating pushing of the topic asset to the subscriber.

Systems and computer program products corresponding to the above-summarized methods are also described and claimed herein.

Further, additional features and numerous advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, disclosed herein is a technique for handling security, including authentication and authorization, in a three party publisher/subscriber data processing broker network, wherein the publisher dictates security policies for subscribers. The publisher provides the security policies, implementation techniques and information content (i.e., topic asset) to the broker. The broker provides the information content to subscribers in accordance with the security policies and techniques provided by the publisher. A single broker may implement different security policies for different publishers, or for different topics from the same publisher. The information content and terms of access may be privately negotiated between the publisher and subscriber, yet implemented between the broker and subscriber. As enhancements, the broker may be provided with the ability to notify the publisher of subscriber activity, including beginning and ending times for receiving information content from the publisher, and dynamic topic name alteration, i.e., redirection or reconfiguration of information content from the publisher at the broker before forwarding to the subscriber. These and other aspects of the present invention are described in detail herein and recited in the claims appended herewith.

Figure 1:
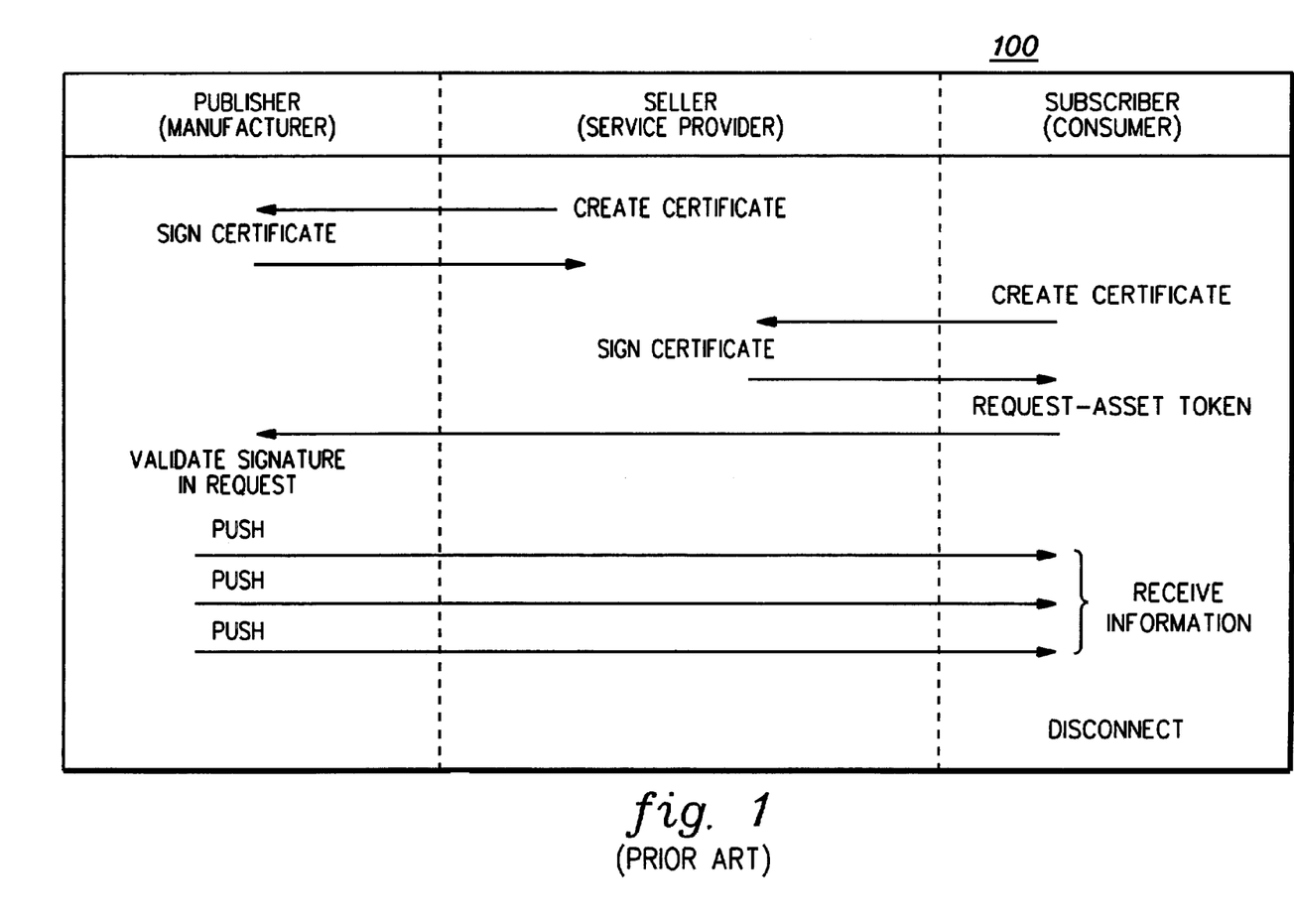
FIG. 1 is a diagram of conventional processing for establishing secure connection in a publish/subscribe data processing network.

FIG. 1 depicts a conventional approach for establishing a secure connection between a publisher and subscriber in a publish/subscribe data processing network 100. As shown, the subscriber is certified by an intermediate seller or service provider. The seller is typically providing the common billing point for the publisher, and is making the information content available as a "value added service" to other services provided to the subscriber (or consumer), such as stock sales. The seller creates a certificate and passes that certificate to the publisher (i.e., supplier, manufacturer, content provider, etc.) for signing, after which the certificate is returned back to the seller. At some later time, the subscriber creates and forwards a certificate to the seller to be signed. The seller signs this new certificate using, in part, the certificate received from the publisher. This signed certificate from the seller is then used by the subscriber to request information content (i.e., an asset token or topic asset) from the publisher. The publisher receives the request, validates the signature in the request, and upon validation begins to push information content to the subscriber, who continues to receive the information until disconnecting.

Figure 2:
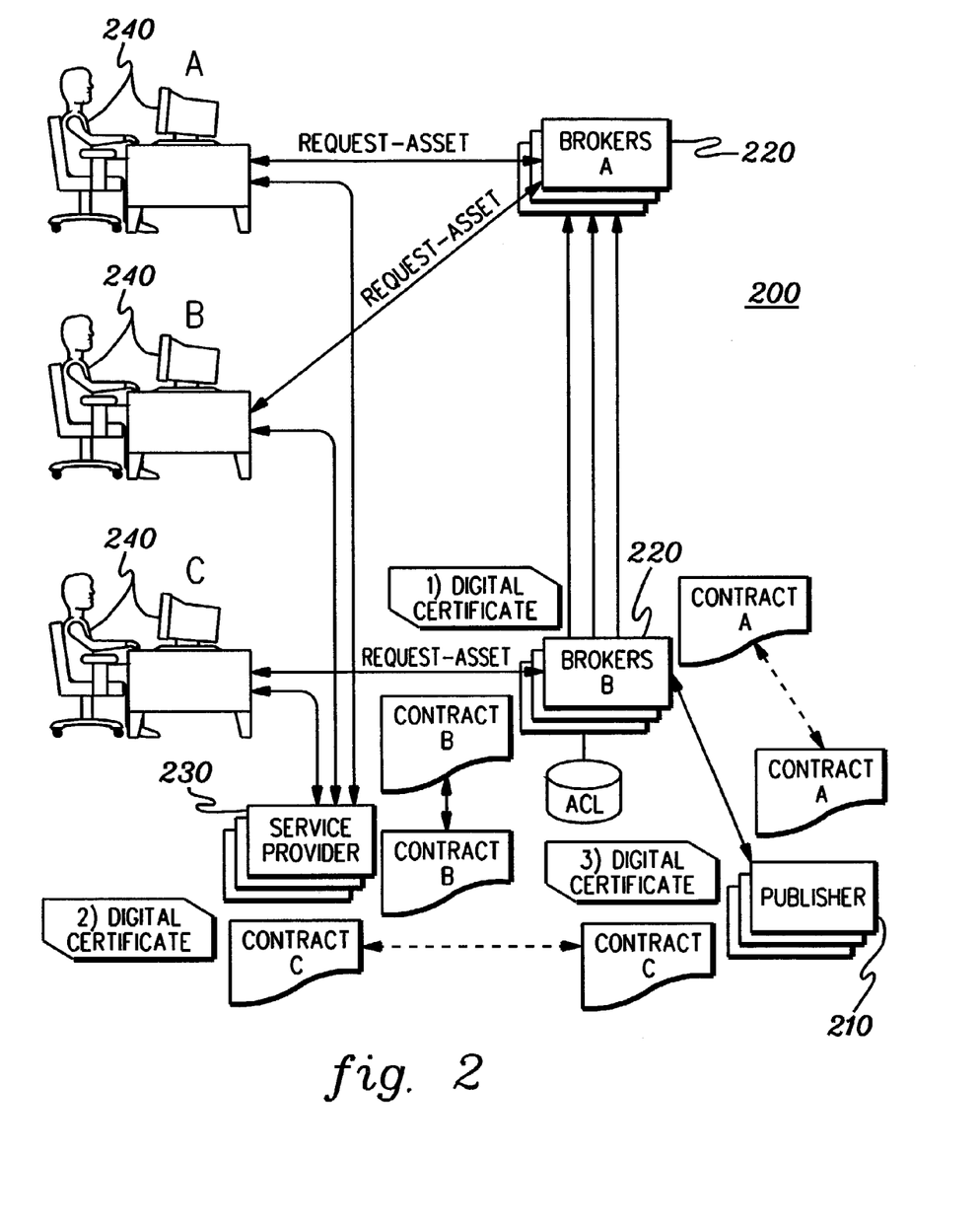
FIG. 2 depicts the architecture of a publish/subscribe broker network within which a security extension is to be employed, in accordance with an aspect of the present invention.

FIG. 2 depicts an enhanced network 200, referred to herein as a publish/subscribe data processing broker network, which is an extension of the point-to-point communications of FIG. 1. In the software industry, international standards for message publishing have evolved, called Java Messaging Standards (JMS). JMS is described in detail in various publications, including a publication entitled "Java Message Service" by Sun Microsystems, version 1.1, Apr. 12, 2002, the entirety of which is hereby incorporated herein by reference. While these standards describe both point-to-point and multicast routing, the present invention is more closely associated with the multicast standards. These standards describe how a publisher categorizes data it wishes to publish, and also specifies protocols for the subscriber to receive the messages that are broadcast. However, the standards are silent on what authentication and authorization mechanism should be employed.

In the messaging protocols, the content provider is referred to as the publisher 210, since the publisher is the source of most information flow. The receiver of the information is called a subscriber 240, who receives rights to the information content through a service provider or seller 230. The application that transports (and typically fans out) the messages is often called a broker 220. The information flows in association with a subject or topic. The topic is typically represented by a character string, with levels of qualification, separated by a delimiter (usually a slash). Typically, the responsibility of controlling access of a subscriber to a topic is controlled at the broker, and has historically been based on Access Control Lists (ACLs). ACLs allow for a simple matching check of a user identity and password against a table of users managed by the broker. If access is gained, any future message received on that topic will be forwarded to the subscriber. A single subscriber may have many concurrent subscriptions. It is typical to accept wildcard symbols (like an asterisk) to gain access to these clusters of subscriptions. A similar access control is used when a publisher attempts to connect to a publisher, and the topic that the publisher wishes to broadcast on is defined. The publisher's topic cannot have any wildcard symbols in its definition. Associated with the messaging standards, Public Key Infrastructure (PKI) Standards have also evolved. These standards permit the strong encryption of information with asymmetric keys. The asymmetric key algorithm is processor intensive, so other encryption techniques complement this technology, such as Hash Code and Data Encryption Standards (DES).

The present invention assumes that the connectivity and basic access control between computers are in place. These connectivity rights are based on contracts, such as contract A between publisher 210 and broker 220, contract B between broker 220 and service provider 230, and contract C between service provider 230 and publisher 210. Through the contracts, digital certificates (e.g., digital certificate 1), digital certificate 2), digital certificate 3)) are provided for the signing of data between the publisher, brokers and service provider. Each digital signature uses asymmetric keys, often referred to as the public and private key pair. This information is required to secure or authenticate information on the channel between these components. The access controls for initial connection between the broker machines and the publisher (content provider) are beyond the scope of this invention, but well understood in the art. Because a subscriber will exploit the extended authentication and authorization described hereinbelow, their authorization from the service provider is not of concern. The invention assumes that associated with business contracts shown in FIG. 2, a digital certificate exists for each contract. These certificates are used to protect information, as well as demonstrate authorization. Further, it is necessary for the public key for the broker to be available to the publisher. The public key of the publisher is also available to the service provider, which controls the applications (240) that will subscribe to the broker. The publisher must also have the public key of the subscriber.

Figure 3:
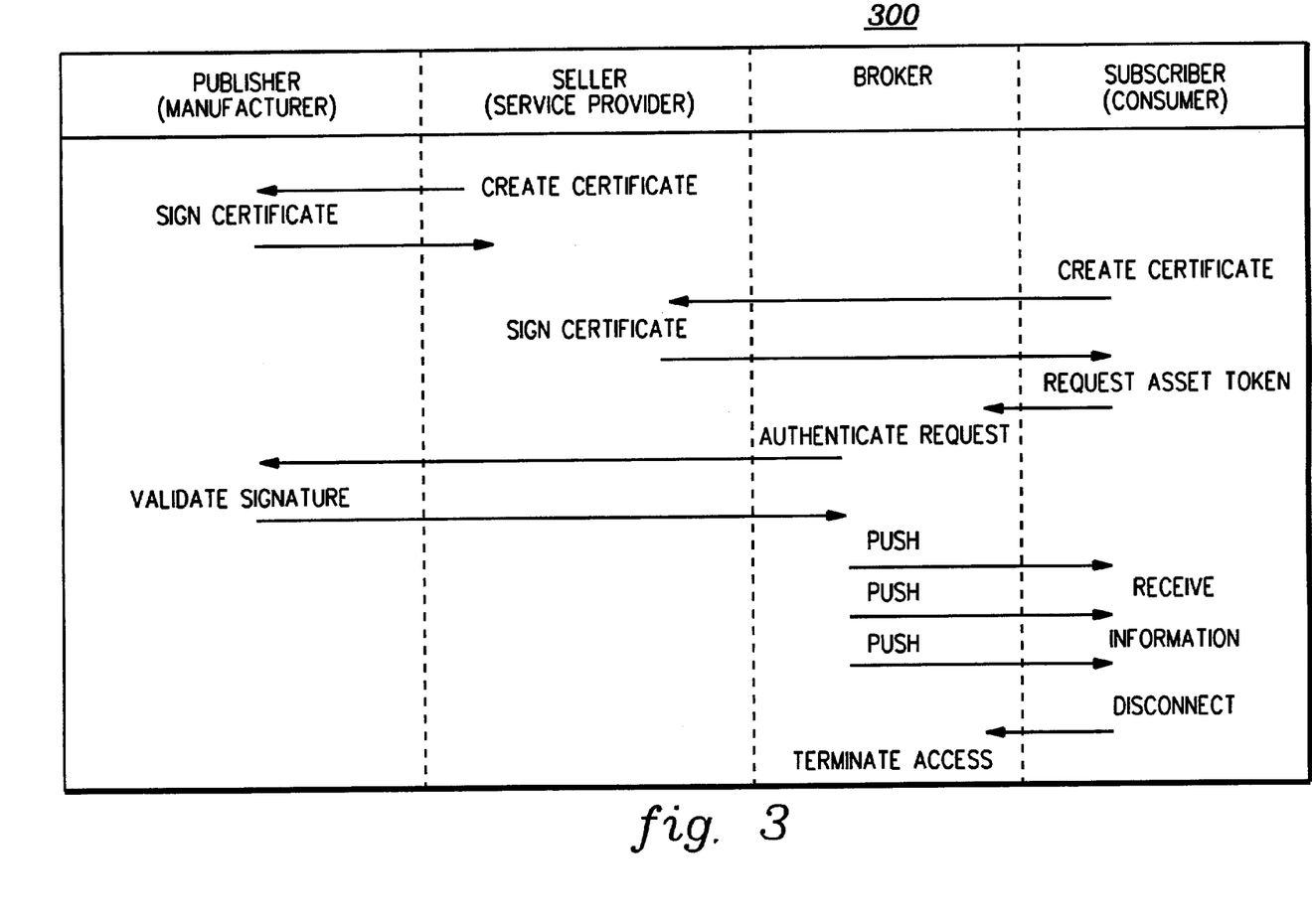
FIG. 3 shows one embodiment of a process for establishing security in a publish/subscribe data processing broker network, in accordance with an aspect of the present invention.

FIG. 3 depicts a publisher/subscriber data processing broker network, generally denoted 300, which extends the processing of FIG. 1 to include the broker, introduced in FIG. 2. Processing is initially similar to FIG. 1 in that the seller creates a certificate which is signed by the publisher, and then used by the seller to sign a certificate created by a subscriber. The subscriber then uses the signed certificate from the seller to request information content (i.e., an asset token). This request is forwarded to the broker which authenticates the request. To authenticate a subscriber, the base messaging service would typically use a user identification and password, known to (and managed by) the broker. The broker could validate the consumer by checking the consumer's digital certificate (as well as a certificate revocation list (CRL)). Extending this logic, the broker could also pass the certificate to the publisher for their validation, as shown in FIG. 3. After the publisher validates the certificate, the broker could pass the information content from the publisher to the subscriber, who continues to receive the information content up until disconnecting. Upon noting a disconnection, the broker terminates the subscriber's access.

In FIG. 3, the broker is responsible for security and authorization decisions, and may be serving many subscribers for the same publisher concurrently for the same topic. One example of this is a message broker for dissemination of information from a publisher, which has significant value. This might be used for stock trading activity, or possibly for job scheduling when looking for machines that can act as a grid engine. In the model of FIG. 3, the broker passes the request token from the subscriber to the publisher for validation. If accepted, authentication and authorization are permitted. This unfortunately can cause a delay in the delivery of the first message (because of network traffic and delay) and can also result in bursting activity at the publisher, i.e., when validating tokens from a large number of subscribers. Further, it is possible that the machines that belong to the broker are distributed around the world, and intentionally work autonomously to make them faster.

As understood in the art, "authentication" is any process by which a system verifies the identity of a user who wishes to access the system. Authentication conventionally may be implemented using credentials, composed of for example the user id and password, or alternatively, may be implemented with smart cards or even a public key infrastructure. Essentially, the authentication means the ability to confirm the identity of a person or machine through the attributes that they are able to provide. "Authorization" refers to checking for the extent to which an authenticated user is entitled to use a topic asset. One simple example would be the levels of confidential information employed by the military. If you have "secret" clearance you would be denied access to "top secret" documents. Essentially, authorization refers to a process of giving a user permission to do or possess something. Logically, authorization is preceded by authentication.

Figure 4:
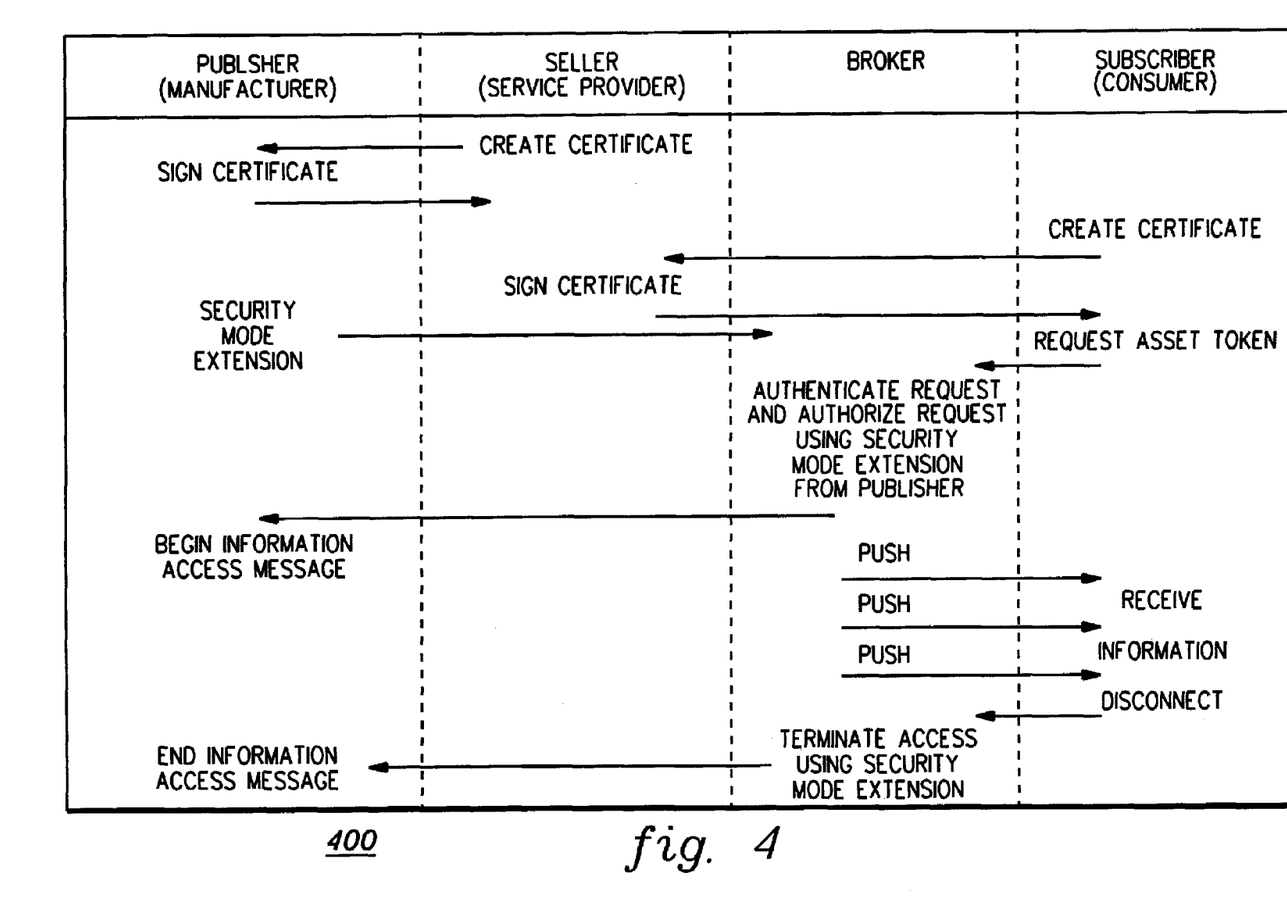
FIG. 4 shows another embodiment of a process for establishing security in a publish/subscribe data processing broker network, in accordance with an aspect of the present invention.

In overview, FIG. 4 demonstrates an ability to move a secured and transportable security application from the publisher to the broker to extend authentication and authorization that the broker would normally do before connecting a subscriber to the channel of information requested from the publisher. This move of security code from the publisher to the broker enables connections from the subscriber to the broker's channel of information with little or no latency beyond the base user identification and password checking. This enables the publisher to participate in every connection to their asset (the channel of content), and does not disrupt the existing channel of information flow that the subscriber uses to acquire the asset (the information). This figure also depicts the sending of messages from the broker to the publisher to document the beginning of information access by a subscriber, as well as termination of information access by the subscriber. This enables more accurate accounting between the publisher and the seller, which is normally accountable for the transmission of the topic asset to the subscriber.

As shown in FIG. 4, the execution process begins similarly to that depicted in FIG. 3 in that the subscriber receives a signed certificate from the seller indicating the seller's agreement to permit the subscriber to receive information from the publisher on their behalf. In this embodiment, however, the publisher provides the broker with a security mode extension at some time prior to the subscriber requesting an asset token of the publisher. The security mode extension comprises the deployment of code to the machines that are owned and operated by the broker. One complication is the need to send portable objects from the publisher to the broker, i.e., at least in a JAVA implementation. Other languages may be used, but the security extensions would need to be in a platform expression that match the broker's deployment. Further, it may be necessary to transmit security keys in this code, so the actual movement of the extension happens within a secure channel. Though any security channel is viable, JAVA provides these services through the java.security.*classes.

Since the broker possesses the security extension code from the publisher, when a request is received from the subscriber, the certificate is simply passed to the local instance of the security check from the publisher. The request is checked against the tree of the signing authorities to ensure that the certificate is legitimate. As explained further below, this checking can include both authenticating the request and authorizing the request using the security mode extension code received from the publisher.

After the certificate is authenticated, a notification (from the security extension) can be provided from the broker to the publisher noting that the subscriber is beginning to receive information content. An option here is to send an asynchronous message for each certificate authenticated. This gives specific content on who is using what information content. The technique should include a second call to the security extension at the end of the broker access to send a second "end of use" message (often observed as an IP connection drop). An alternative option would be to maintain a count on the broker system, with this information count being periodically sent back to the publisher. This would give a high water mark measure from each broker machine. FIG. 4 depicts the first of these alternatives. As shown, the broker forwards a "begin information access" message to the publisher upon authentication and authorization of the request from the subscriber. Thereafter, the information content is pushed through the broker to the subscriber, who receives the information up until disconnecting. Upon the broker noting a disconnection, the broker generates an "end information access" message to the publisher, again using the security mode extension received from the publisher.

As noted, the broker in FIG. 4 has the capability of authenticating and authorizing a request using the security mode extension from the publisher. Authorization could include checking the request to determine whether to deny service, even for a validly signed certificate. For example, the seller validly signs a customer's certificate but the publisher may choose not to serve the particular subscriber. An example in the grid world would be having the American Heart Association reject use of their computers by a tobacco company. Another use for this security extension would be to adapt the type of service that is to be provided to the subscriber. For example, it may be possible for the publisher to define one common service, and then based on the type of arrangement made with the seller, the content of the information could be adjusted at the time of the connection through the broker. An example of this would be currency of the information fed for trading activities. More current feeds would garnish higher fees. Thus, in addition to dynamic extension of the security service, it is possible for the security extension to enable other services for the publisher that are implemented at the broker. This assumes the maintenance of adequate security through the network for transporting the sensitive information in code between the publisher and broker, as described herein.

Thus, instead of using just an ID and password for access to the information content, the broker extends its authorization checks with code that is provided by the publisher. While many forms of code distribution exist, this invention assumes an association of the extension to the authorization methods with the initial connection from the publisher to the broker.

Since brokers handle many different topics, it is necessary to associate (with authentication and authorization) the subscriber to the topics. Classically, this has been done by administering lists of user identities and passwords at the broker systems.

As noted, instead of putting the onus for authentication on the broker, this invention builds in one aspect a security extension that is developed, coded and encapsulated by the publisher. As the publisher associates with the broker for a specific topic, the method for security to connect to the topic is identified. For example, this technology can be defined as "subPKI". When SubPKI is requested, the broker acquires an encapsulated object that is used during subscription connection.

In practice, the publisher provides code that validates the credentials presented by the subscriber. This code is in a platform neutral language, such as JAVA or REX. The code is typically a validation of a digital signature of a message presented at the subscription binding time. If the signature is considered valid, then the subscription is granted.

As part of the "validation" process, one optional feature might be to include changing the topic name that was initially requested. A second optional feature might be to have the security extension module become a publisher to the broker and forward "connection information" back to the content provider. This provides a convenient technology for usage accounting.

Validating credentials is a non-trivial process. The digital signature validate routines should carry their own certificate, so protection of the code is paramount. For JAVA, the java.security.* and javax.crypto.* packages contain the necessary methods for the extensions described in this invention. The SecretObject Class enables the code to be secretly encapsulated, for transmission to the broker machines. Java security packages are described further in a publication authored by Scott Oaks entitled *Java Security*, Second Edition, published by O'Reilly Publications, ISBN:0-596-00157-6 (May, 2001), the entirety of which is hereby incorporated herein by reference.

By extending the security service in the broker machine, there will be minimal latency in the authorization of subscriptions, which can be critical for a short subscription session. Previous JMS authentication by the broker required a user id and password to be presented during the binding process. For initial binding of the publisher, this access continues to be reasonable and acceptable. But, the binding will not only indicate the topic that will be published, but also the topic tree that will be covered by the authorization code, as well as the code itself. The way the code is transmitted is not within the scope of this invention, but the encapsulating with the JAVA SecretObject class is one possibility. To accomplish this, the public key of the broker's digital certificate needs to be known to the publishers. Further, by capturing the time a binding begins and ends, it is unnecessary to log all information transmitted to the subscriber.

Figure 5:
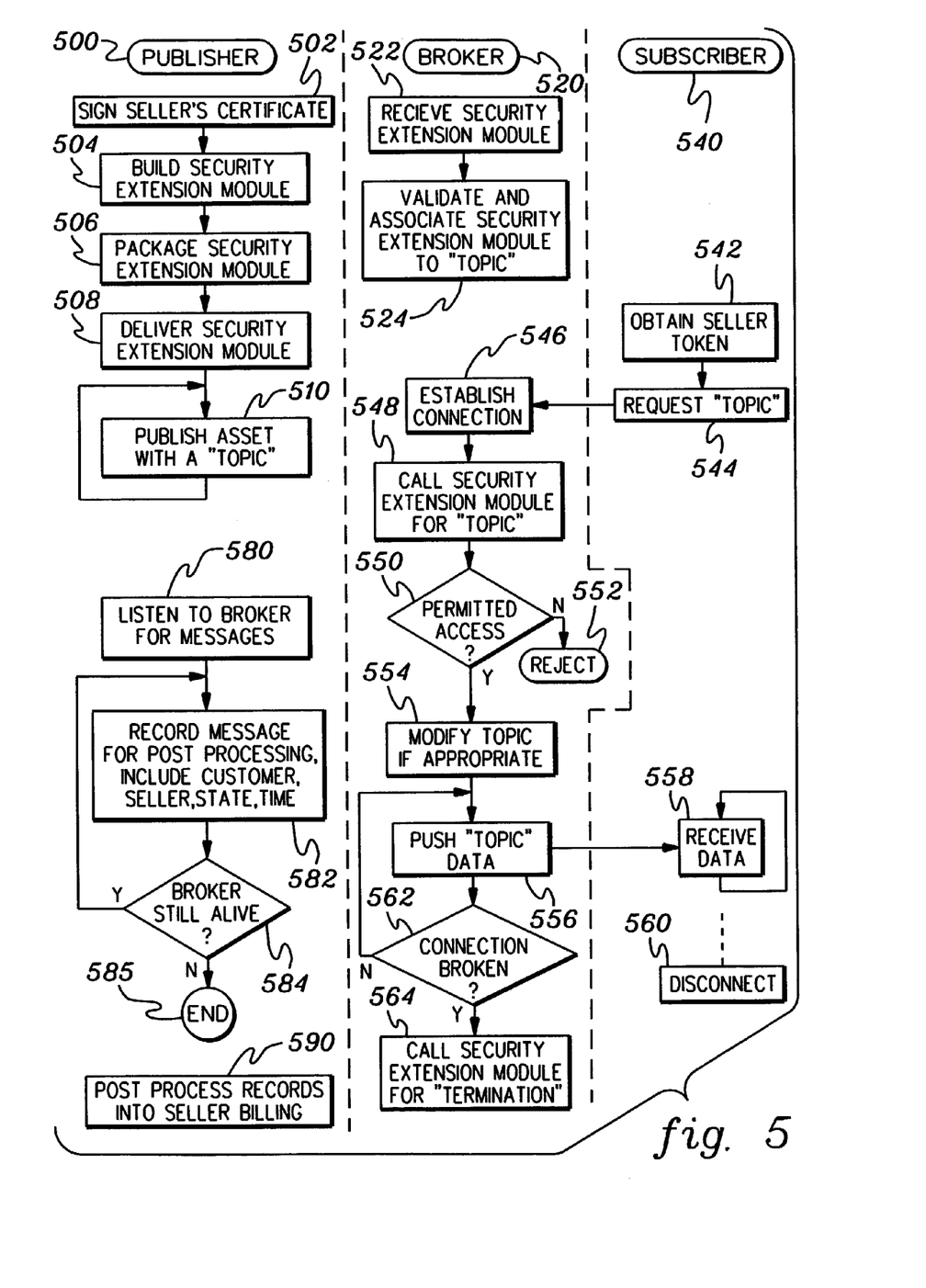
FIG. 5 is a flowchart of one embodiment for establishing security and pushing topic data to a subscriber in a publish/subscribe data processing broker network, in accordance with an aspect of the present invention.
Figure 6:
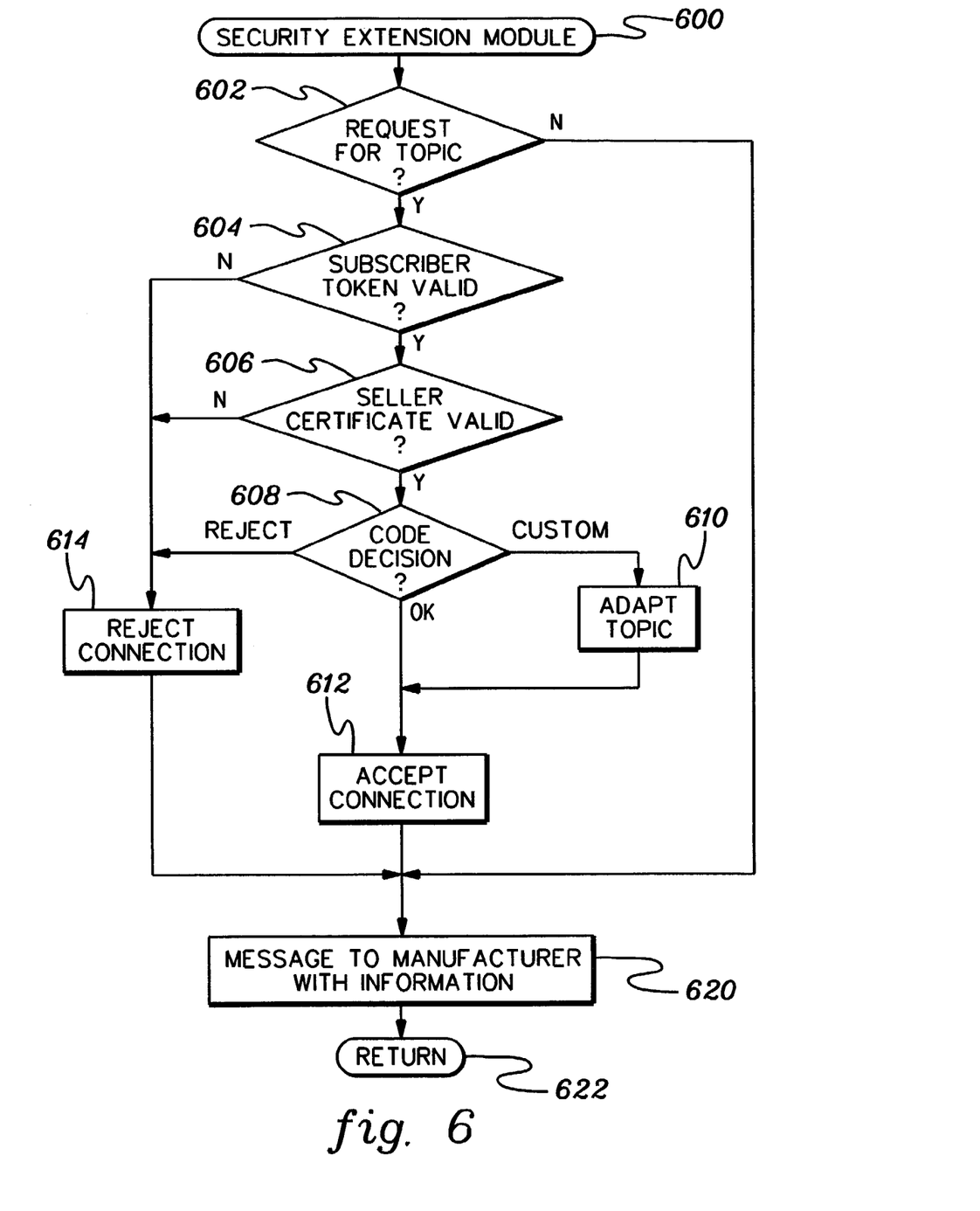
FIG. 6 is a flowchart of one embodiment of processing implemented by a security extension module built by a publisher and provided to a broker, in accordance with an aspect of the present invention.

FIG. 5 depicts a more detailed example of the security mode extension process implemented by the publisher, broker and subscriber, in accordance with an aspect of the present invention. The flowcharts of FIG. 5 document one example of logic flow that encompasses creation, transport and use of a security extension module, one embodiment of which is depicted in FIG. 6. There are several forms of transmitting or transporting this code. In one simple form, the module can be composed of Java, as a class, and transmitted as a class module, or as part of a Java ARchive (JAR). Additionally, the code could be built and exported with the object output interface. The object output interface is a well known deployment technique which enables the publisher significant flexibility in deployment, versioning and security. Independent of the mechanism used for packaging, this application is provided to the broker system, and associated with a publisher's asset. The security extension module can be associated with an asset during the createPublisher function in JMS, either as an extension to the existing interface, or additional methods invoked. The Java messaging services as they currently exist are described in a publication by David Chappell & Richard Monson-Haefel entitled *Java Message Service*, published by O'Reilly Publications, ISBN:0-596-00068-5 (December, 2000), the entirety of which is hereby incorporated herein by reference. This book is a thorough introduction to Java Message Service Microsystems and shows how to build applications using the publish-and-subscribe models.

The processes of FIG. 5 are separated between a publisher 500, broker 520 and subscriber 540. Beginning with the publisher 500, the publisher signs a seller's certificate 502 as described above in connection with FIG. 4. Additionally, the publisher builds a security extension module or code 504 which is packaged 506 and delivered 508 to the broker. After delivering the security extension module, the publisher publishes an asset with a "topic", also referred to herein as information content. The topic asset is published through the broker 520.

Broker 520 receives the security extension module 522 and validates and associates the security extension module with a particular topic 524. At some time later, the subscriber obtains a seller token 542 and requests information content on the "topic" 544. This request is received by the broker and a connection is established 546. The security extension module is called at the broker for the particular topic requested 548 and the broker determines whether to permit access 550. If no, then the request is rejected 552. If access is permitted, the broker determines whether to modify the topic information as appropriate based upon the security extension module 554 and the requesting subscriber. The topic data from the publisher is then pushed by the broker to the subscriber 556, who receives the data 558 up until disconnecting 560. Upon establishing that a connection has been broken 562, the broker calls the security extension module again for termination processing 564.

The security extension module disclosed herein is thus employed both upon granting of access to an asset topic, as well as termination of connection for receipt of that topic. This allows a message to be sent at each instance from the broker to the publisher, who is listening for these messages 580. Upon receipt of an initiation or termination message from the broker, the publisher records the appropriate information for post processing. This recordation can include the customer (subscriber), seller, state of connection, and time of connection/disconnection 582. The publisher thereafter determines whether the broker is still alive 584, and if not, ends the connection 585. At some point during a post process, the message information recorded at the publisher is employed for recording the records to the seller billing 590.

FIG. 6 depicts one example of processing implemented by a security extension module 600, provided from the publisher to the broker. This processing includes determining whether the request is a request for a topic asset 602, or is a request for termination of a connection to a topic. If the request is for termination, then processing proceeds directly to message the publisher with the appropriate information 620, before returning from the security extension module 622.

Assuming that the request is for a topic asset, then the security extension module is employed to determine whether the subscriber token is valid 604. Determination of whether the subscriber is making a legitimate request for an asset can be performed, for example, by using the Java Security package.

Thereafter, processing determines whether the seller certificate was valid 606. It is typical to have a token provided which was signed by a seller, with the information such as the requestor, asset level to provide and duration of time to provide the information. By convention and variables that are declared within the security extension module, many more checks could be provided beyond just verifying valid mathematics were applied to the characters representing the customer. This can be implemented in a code decision 608, where it would be possible to adapt the request of the particular subscriber (and implicitly the seller) to fit the use. For example, in stock trading, this could be used to adapt from a request for a real-time feed to a feed with a ten minute delay, based on a lower cost seller contract. Other options could include either the acceptance of the authentication, without adaptation, or rejection of the request for reasons of authorization 614. Once the code decision authorizes the request, or after the topic asset has been adapted 610, the connection is accepted 612.

Whether the request was to end or acquire an asset, and whether the request was accepted or not, it may be useful to notify the publisher of the event 620. The type of request, disposition of the request, the subscriber making the request and when the request was made, provide valuable information to the publisher. This could be provided by a point-to-point messaging back to the publisher, again using JMS in one example. This transmission would be asynchronous so it would not affect the speed with which the security extension module could execute. After sending the message, processing returns to the point of call 622.

By way of specific example, the following Java code is an example of a security extension module at the broker:

```
import javax.crypto.Cipher;
import javax.crypto.SealedObject;
import java.io.*;
import java.util.*;
public class   SecExtMod implements Serializable {
    public    SecExtMod( ) { }       // Simple constructor
    public Integer getNum(Hashtable x) { // Security Extension Logic
       String topic;   // Local work variable
       Integer num;    // Local work variable
       topic = (String)x.get("Topic"); // Extract passed Topic
       num = (Integer)x.get("NUM");    // Pick up pass number
       System.out.println("SecExtMod:"+topic+" Num:"+num); // Show
       return num;      // Return code of the number
    }
}
```

One example of Java code to allow a publisher to get ready to connect to a broker to publish information would be:

```
import java.io.*;
import java.util.*;
import java.lang.*;
public class TstExtMod {         // TEST PROGRAM TO BUILD
    public static void main(String args[ ]) throws Exception {
       boolean resolveIt;
       Object SecExtMod = null;
       Hashtable x = new Hashtable( );  // create package to serialize
       x.put("NUM",new Integer(1));     // Pass along information
       x.put("Topic",new String("com.IBM.*")); // Pass publish topic
       try {
           SecExtMod = (Class.forName("SecExtMod").newInstance( ));
           x.put("SecExtMod", SecExtMod); // the routine to execute
           ObjectOutputStream out = new ObjectOutputStream(new
              FileOutputStream("test2.dat")); // Put in file for example
           out.writeObject(x);         // Move object to file
           out.close( );               // Close the output file
       } catch(Exception e) {System.out.println("Exception"+e);}
    }
}
```

Finally, an example of Java code that would allow a broker to get and invoke a security extension module would be as follows:

```
import java.io.*;
import java.util.*;
import java.lang.*;
public class ExExtMod { // TEST SHIPPED CODE IN BROKER
    public static void main(String args[ ]) throws Exception {
       ObjectInputStream in = null;      // Input Data Object
       Hashtable x = new Hashtable( );   // serialize object
       try {
          in = new ObjectInputStream(new FileInputStream("test2.dat"));
          x = (Hashtable) in.readObiect( );  // Read Object to Hashtable
          SecExtMod sem = (SecExtMod) x.get("SecExtMod");// Get Class
          Integer rc = ((Integer) sem.getNum(x));
          //DO SECURITY EXTENSION
          System.out.println("Returned="+rc); // Show return code
          in.close( );                    // close Topic object
       } catch(Exception e) {System.out.println("Exception"+e);}
    }
}
```

Those skilled in the art will note from the above discussion that provided herein is an extension of the security components related to broadcast message delivery. The concepts presented herein can incorporate the use of public key infrastructure, and provide the ability to transport security extensions with server neutral coding standards. Based upon authentication extension, other authorization facilities become viable, such as better logging of content delivered and automatic subscription alteration, based on constructs outside the basic authentication process. This invention describes a technique which administers authentication and authorization to information content through a generally available broker machine, which may be geographically positioned closer to the subscriber, then the publisher. The access to the content is coordinated between the broker and the content provider, instead of solely by the broker or the content provider.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for establishing security in a publish with subscribe data processing broker network, said method comprising:

providing a security extension module comprising transportable, executable program code from a publisher to a broker of the network, the security extension module comprising security constraints for a topic asset of the publisher, the security constraints for the topic asset being defined by the publisher, and allowing the broker to perform authentication of a request from a subscriber for the topic asset on behalf of the publisher without forwarding the request to the publisher;

executing the security extension module at the broker responsive to receipt of the request from a subscriber for the topic asset, said executing including authenticating the request at the broker on behalf of the publisher before pushing the topic asset of the publisher to the subscriber; and wherein the security extension module comprises program code for automatically forwarding a begin information access message from the broker to the publisher, and an end information access message, and wherein the executing of the security extension module further includes automatically forwarding the begin information access message from the broker to the publisher upon the broker beginning pushing of the topic asset of the publisher to the subscriber, and automatically forwarding the end information access message from the broker to the publisher upon the broker terminating pushing of the topic asset of the publisher to the subscriber.

2. The method of claim 1, wherein executing the security extension module at the broker further includes authorizing the request at the broker pursuant to the security constraints defined by the publisher before pushing the topic asset of the publisher to the subscriber.

3. The method of claim 2, wherein the authorizing of the request includes determining whether to adapt the topic asset of the publisher at the broker, pursuant to the security constraints defined by the publisher, based on the subscriber forwarding the request.

4. The method of claim 1, wherein the executing of the security extension module at the broker further includes determining at the broker that a subscriber password and id associated with the request are valid, and determining that a seller's certificate associated with the request from the subscriber is valid.

5. The method of claim 1, further comprising building the security extension module and packaging the security extension module at the publisher for delivery to the broker, and upon receipt of the security extension module at the broker, validating the security extension module and associating the security extension module with the topic asset published by the publisher.

* * * * *